United States Patent Office 3,606,310
Patented Sept. 20, 1971

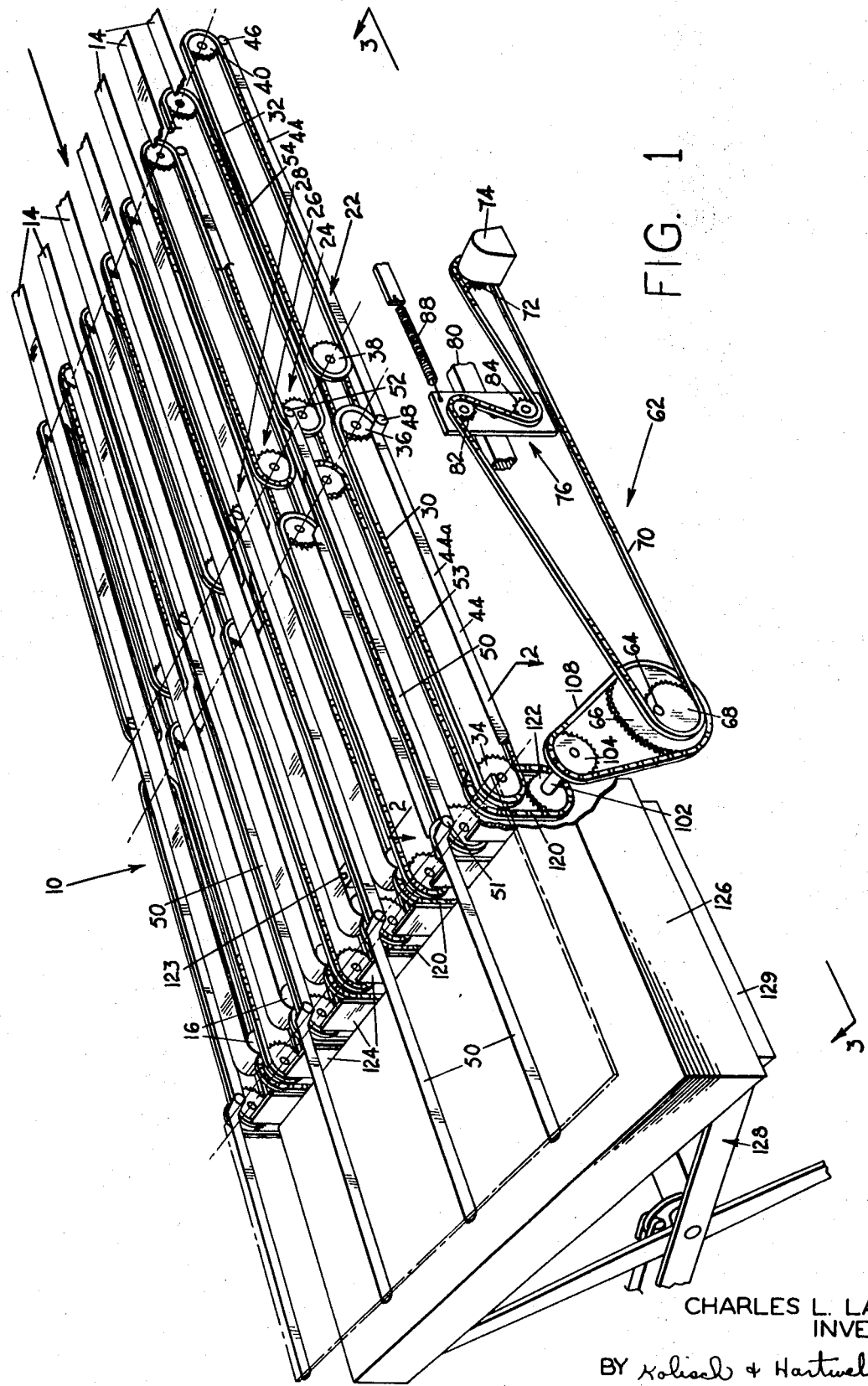

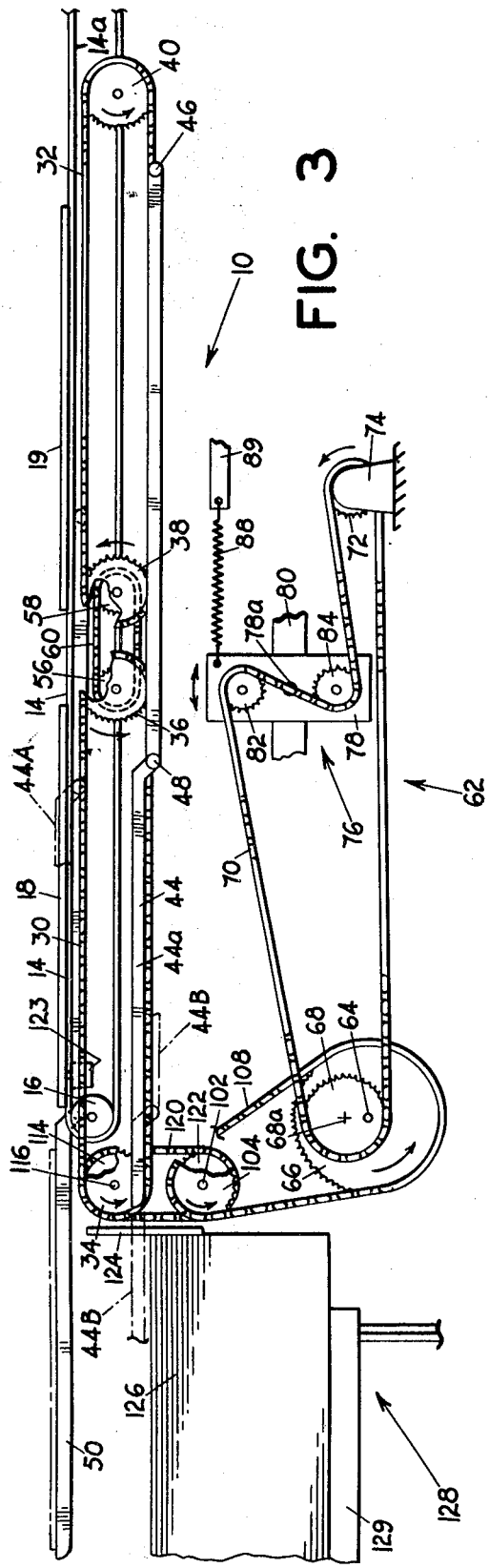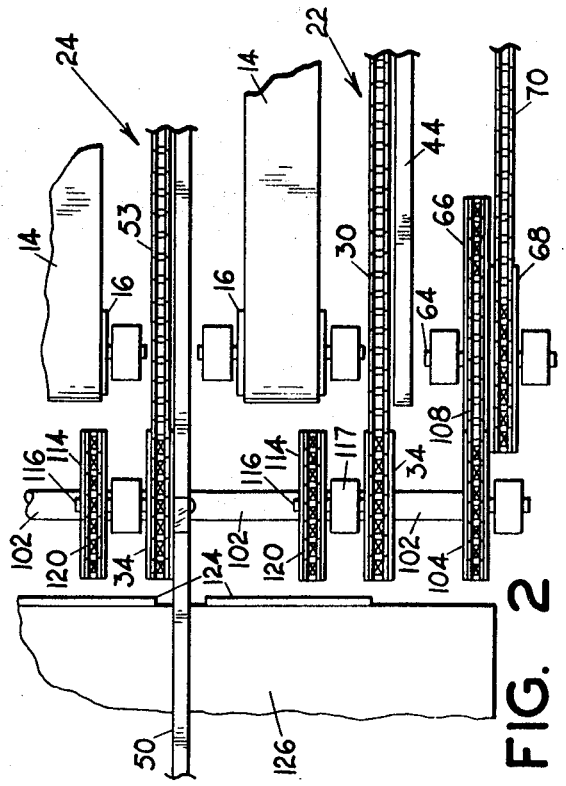

3,606,310
STACKING APPARATUS
Charles L. Larson, Grants Pass, Oreg., assignor to Jeddeloh Bros. Sweed Mills, Inc., Gold Hill, Oreg.
Filed Mar. 4, 1970, Ser. No. 16,333
Int. Cl. B65h 29/34
U.S. Cl. 271—68
7 Claims

ABSTRACT OF THE DISCLOSURE

Stacking apparatus including a pair of parallel, laterally spaced, elongated conveyor belts for supporting the undersides of articles and conveying them forwardly along a horizontal path. A pair of endless, elongated chains are mounted in tandem between the conveyor belts with their upper reaches paralleling and beneath the path of the conveyor belts. An elongated stacker arm paralleling the conveyor belts is connected to the chains. The arm is connected to the chains in such a manner that powered movement of the chains with their upper reaches moving forwardly causes the arm to move successively first upwardly, to a raised position above the path of the conveyor belts to lift an article from the conveyor belts, then forwardly to a raised extended position, thence downwardly and below such path, and thence rearwardly, to a lowered retracted position. Another stacker arm connected to a matching pair of chains is moved out-of-phase with the first-mentioned arm. A stop member mounted forwardly of the conveyor belts engages an article carried by either arm as the arm is retracted, and operates to move the article off the arm. Motor-powered means moves both stacker arms at variable speeds. An elevator with platform receives articles moved off the arms.

---

This invention relates to stacking apparatus.

A general object of this invention is to provide novel stacking apparatus which operates to lift articles, carried one after another, on a conveyor, and to deposit such articles, one on top of another, to form a stack.

The apparatus is particularly suited for the stacking of articles such as panels and a preferred embodiment of the invention contemplates a panel-stacker.

Another object of the invention is to provide such a stacker which is capable of handling articles following one another closely on a supplying conveyor.

In a preferred embodiment of the invention, multiple sets of stacker arms are provided, with one set of arms being moved out-of-phase with another set of arms. Movement of the arms is coordinated so that a series of arms in a set are moved in phase and are caused to perform the sequence of first moving up under a panel and lifting it off the supplying conveyor and thence carry the panel forwardly beyond this supplying conveyor to deposit it on a stack. During retraction of this series of arms, another series of arms moving in phase functions to perform the same sequence on a following panel.

Another unique feature of the invention is the provision of motor-powered means for producing movement in the various arms which is a variable speed means producing faster movement of a series of arms when such are functioning to shift a panel forwardly than is produced when such arms are operating to lift the panel off the conveyor or operating to deposit a panel onto a forming stack. As a consequence, greater overall speed in operation is obtainable.

These and other objects and advantages will become more fully apparent as the following description is read in conjunction with the drawings, wherein:

FIG. 1 is a simplified perspective view of stacking apparatus constructed in accordance with an embodiment of the invention;

FIG. 2 is an enlarged view taken generally along the line 2—2 in FIG. 1;

FIG. 3 is an enlarged view taken along line 3—3 in FIG. 1 illustrating, in simplified form, motor-powered means provided in the stacking apparatus for producing movement of chain belts therein.

Referring now to the drawings, and first more specifically to FIG. 1, at 10 is indicated generally stacking apparatus according to one embodiment of the invention. The apparatus is illustrated devoid of much of the usual supporting framework to simplify the drawings and to obtain greater clarity in explaining the invention.

Provided for the purpose of feeding articles, such as panels or sheets, into the stacking apparatus, are multiple elongated, endless, laterally spaced, power-driven conveyors, or conveyor belts, 14. These have forward extremities trained over rollers, such as axially aligned rollers 16. The upper reaches 14a of belts 14 occupy a common, substantially horizontal plane. The belts are driven with their upper reaches traveling to the left in the figures. The belts support the undersides of articles, such as sheets of veneer, indicated generally at 18, 19 in FIG. 3, and convey them one after another, along a substantially horizontal path.

Interspersed with the conveyor belts are lifter assemblies, such as those indicated generally at 22, 24, 26, 28 in FIG. 1. The assemblies are similar, and thus only one will be described in detail.

Referring specifically to FIGS. 1 and 3, each lifter assembly includes a pair of elongated endless chain belts, or chains, 30, 32. Chain 30, which constitutes the forward chain belt, or chain, in the lifter assembly is trained at its forward extremity over a sprocket 34 and at its rear extremity over a sprocket 36. Chain 32 is trained at its forward extremity over a sprocket 38 and at its rear extremity over a sprocket 40. The chains are thus mounted in tandem. The various sprockets all have the same diameter and mount the chains with their upper reaches in a common plane and slightly below the plane of belt reaches 14a which is the path along which articles travel.

An elongated stacking arm, such as the one indicated at 44, is provided in each of the lifter assemblies. As can be seen with reference to arm 44, such is connected adjacent its rear end at 46 to rear chain 32. The arm is connected intermediate its ends to the front chain at 48. The arm has a raised elongated forward portion 44a which extends forwardly from connection 48.

It will be noted with reference to FIG. 1, and considering adjacent lifter assemblies, such as those indicated at 22, 24 adjacent the bottom of the figure in FIG. 1, that the arm of one lifter assembly is what might be thought of as 180° out-of-phase with the arm in the other lifter assembly. Further explaining, lifter arm 50 is shown with its forward end portion projected forwardly of the conveyor belt 14 and with its points of connection 51, 52 with chain belts 53, 54 disposed adjacent the top of the sprockets carrying the chain belts. Thus, the forward portion of arm 50 occupies a raised projected position. On the other hand, and considering arm 44, the forward portion 44a of this arm is seen retracted rearwardly of the sprocket 34. Further, the points of connection of this arm with chains 30, 32 are disposed adjacent the bottom of the sprockets training rear extremities of these chains. Thus, this arm occupies a lowered retracted position in the apparatus.

Still referring to FIG. 1, alternate ones of the stacker arms have their forward extremities in a raised projected position. Although not as clearly indicated in the drawing, it should be understood that the remaining stacker arms occupy a lowered retracted position. In this way, there is present in the apparatus a series of stacker arms that are in phase with each other and another series of stacker arms that are in phase with each other but 180° out-of-phase with the first-mentioned series.

Further considering a lifter assembly, and referring more specifically to FIG. 3, secured for simultaneous rotation with sprocket 36 is sprocket 56, and similarly secured for simultaneous rotation with sprocket 38 is sprocket 58. Drivingly interconnecting sprockets 56, 58 is a chain 60. In this way, movement of the two chains in the lifter assembly is coordinated.

The lifter assemblies are driven by motor-powered means indicated generally at 62, perhaps best illustrated in FIG. 3. Referring to this figure, secured to a shaft 64 which is suitably journaled in the apparatus, is a sprocket 66 and a sprocket 68 of somewhat smaller diameter. Sprocket 66 is concentric with the shaft, whereas sprocket 68 is eccentrically mounted. In FIG. 3 the center of sprocket 68 is indicated at 68a.

A drive chain 70 is trained over sprocket 68. The opposite extremity of the drive chain is trained over a power-driven sprocket 72 driven by a motor 74. The chain, between its extremities trained over sprockets 68, 72, travels through a take-up device shown generally at 76 which accommodates eccentric movement in sprocket 68 and maintains chain tension.

Considering in further detail the take-up device, such includes plate 78 journaled at 78a on a support member 80 which may be part of the frame of the apparatus. Journaled for rotation on plate 78 are a pair of sprockets 82, 84 training reverse bends of chain 70. Plate 78 is yieldably urged to rotate in a clockwise direction in FIG. 3 by a spring 88 extending between the plate and an anchor 89.

With continued reference to FIG. 3, shown at 102 is a shaft which extends transversely of the various lifter assemblies adjacent the offbearing extremities of conveyor belts 14. Joined to this shaft is a sprocket 104 and drive is transmitted from sprocket 66 to sprocket 104 by a chain 108.

Referring now also to FIG. 2, drive is transmitted from shaft 102 to each of the lifter assemblies by a transmission construction of the type illustrated in FIG. 2. Specifically, sprocket 34 training the forward extremity of chain 30 in the lifter mechanism is joined to a stub shaft 116 journaled in a bearing 117. A sprocket 114 is fixed to the opposite end of shaft 116. A chain 120 transmits drive between sprocket 114 and a like sprocket 122 seen in FIG. 3, secured to shaft 102. This transmission construction is repeated for each of the lifter assemblies.

A normally open limit switch indicated generally at 123 in FIGS. 1 and 3, is supported adjacent a roller 16, in the path along which articles are carried by the conveyors. The switch is actuated by an article, such as a panel or sheet, moving over it, and when so actuated, starts motor 74 for driving the chains of the motor-powered means of which the motor forms a part.

As has already been described, arm 44 in FIG. 1 is shown in a lowered retracted position. On sprockets 36, 40 training the rear extremities of chains 30, 32 rotating 180°, the arm is raised to be placed in its raised retracted position. In its raised retracted position, the forward extremity 44a of the arm is moved slightly above the plane of belts 14. The arm is shifted into its raised extended position, i.e., the position shown for arm 50, on sufficient movement of chains 30, 32 to place connections 48, 46 over the top of sprockets 34, 38. Rotation of these sprockets 180° shifts connections 48, 46 to the bottom of these sprockets, and places the arm in its lowered extended position. The arm may then be retracted to its lowered retracted position with movement of chains 30, 32 to place the connections in the position shown in FIG. 1.

Referring again to FIG. 1, shown at 124 are a series of abutments which are suitably mounted in a stationary position on the framework in a position slightly forwardly of the forward extremities of belt 14. The tops of the abutments are slightly below the plane of the upper reaches of belts 14. The abutments serve to engage the edge of an article, such as a panel or sheet, on lowering of a series of stacker arms followed by retractive movement of such arms, whereby the sheet is prevented from retracting with the arms. The sheet, instead, is slid off the arms by the abutments and dropped to the stack of sheets 126 forming below.

Shown at 128 is a power-operated scissor-lift hoist. Such has a supporting platform 129 at the top thereof which supports the forming stack.

Referring to FIG. 3, due to the eccentric mounting of sprocket 68 on shaft 64, the chains of a lifter assembly, exemplified by chains 30, 32, are caused to be moved at varying speeds with sprocket 72 rotated by motor 74 at a uniform speed. The chains are moved at a relatively fast speed during movement of a stacker arm from a raised retracted to a raised extended position and from a lowered extended to a lowered retracted position. Movement, however, is relatively slow on a stacker arm moving from a lowered retracted to a raised retracted position or on moving from a raised extended to a lowered extended position. The organization permits a sheet to be moved rapidly to a region generally overlying the stack and then to be deposited at a much slower speed onto the forming stack whereby less dis-array of the sheets in the stack takes place.

Further explaining, with sprocket 68 rotated 180° from the position shown in FIG. 3, chain 70 travels about an effectively relatively large diameter sprocket producing, for 180° rotation of shaft 64, a relatively small amount of movement in sprocket 66, chain 108 and the chains of the lifter assemblies. This results in stacker arm 44 in FIG. 3 moving from the position shown in solid outline to the raised position shown in dashed outline at 44A.

With the sprocket 68 rotated 180° from the position shown and with further movement of the chain, chain 70 moves around the sprocket of an effective small diameter resulting in a relatively large amount of movement in chain 108 for a given amount of movement in chain 70. As a consequence, chains 30, 32 move at an accelerated speed to shift the stacker arm 44 into the position shown in FIG. 3 for arm 50. The cycle is then repeated to move the arm at a slow speed from the position shown for arm 50 to the lowered position shown in FIG. 3 in dashed outline at 44B. Movement of the arm from the position at 44B to the position shown in solid outline is at a fast speed.

The operation of the apparatus described should be obvious. Articles, such as panels, are transported into the stacker apparatus on conveyor belts 14. These are picked up one after another by alternate groups of stacker arms. The panels may follow one another closely on belts 14, since with one group of stacker arms depositing panels on the stack, the group of arms which are 180° out-of-phase with the first-mentioned group is in position to pick up a panel and start its movement toward the stack. As the height of the stack increases, platform 129 is lowered to lower the top of the stack and provide clearance for the stacker arms as they move downwardly and start retractive movement into the region of belts 14.

While an embodiment of the invention has been described, it should be obvious to those skilled in the art that variations and modifications are possible without departing from the spirit of the invention.

It is claimed and desired to secure by Letters Patent:
 1. Stacking apparatus comprising:
   an elongated conveyor for supporting the underside of an article and conveying it along a substantial horizontal path,
   a pair of endless elongated belts supported in tandem including a forward belt positioned forwardly of a rear belt, said belts being disposed laterally of said conveyor and having upper reaches extending substantially parallel to but below the level of said path of said conveyor, an elongated stacker arm connected at one point to the forward belt and at another point to the rear belt, said arm being supported by the belts for movement in a course between a raised retracted position where a forward portion of the arm is disposed above said path and to one side of said conveyor, a raised extended position where said forward portion of the arm is above said path and beyond the forward end of said conveyor, a lowered extended position where said forward portion of the arm is beyond the end of said conveyor and below said path, and a lowered retracted position where the forward portion of said arm is to one side of said conveyor and below said path, and motor-powered means for driving said belts.

2. The apparatus of claim 1, which further comprises an abutment disposed forwardly of said forward belt in a position to engage an article carried on said stacker arm on the arm moving from its extended lowered position to its retracted lowered position, said abutment on engaging an article preventing the article from following the arm whereby the article is permitted to drop as the arm retracts.

3. The apparatus of claim 2, which further comprises an elevatable platform disposed under said arm with the arm in its extended lowered position, for receiving articles dropped from the arm.

4. The apparatus of claim 1, wherein said motor-powered means for driving the belts is a variable speed means, producing faster movement of the arm on such moving between retracted and extended positions than occurs on the arm moving between raised and lowered positions.

5. The apparatus of claim 1, which further comprises another pair of endless belts supported in tandem including a forward belt positioned forwardly of the rear belt, said belts being to one side of and substantially matching the first-mentioned pair of belts, and wherein another stacker arm is connected at one point to the forward belt of said other pair of belts and at another point to the rear belt of said other pair of belts, said other stacker arm being moved by said other pair of belts in a course which substantially matches the course in which the first-mentioned arm moves, said motor-powered means driving said other pair of belts, with said other stacker arm being moved out-of-phase with movement of the first-mentioned stacker arm.

6. The apparatus of claim 5, wherein said motor-powered means for driving the belts is a variable speed means, producing faster movement of each arm as it is moved between retracted and extended positions than occurs on the arm being moved between raised and lowered positions.

7. Stacking apparatus comprising:

an elongated conveyor for supporting the underside of an article and conveying it along a substantially horizontal path, a pair of endless elongated belts in tandem including a forward belt positioned forwardly of a rear belt, said belts being disposed laterally of said conveyor and having upper reaches extending substantially parallel to but below the level of said path of said conveyor, an elongated stacker arm connected at one point to the forward belt and at another point to the rear belt, said arm being supported by said belts for movement in a course between a raised retracted position where the forward portion of the arm is disposed above said path and to one side of said conveyor, a raised extended position where said forward portion of the arm is above said path and beyond the forward end of said conveyor, a lowered extended position where said forward portion of the arm is beyond the forward end of said conveyor and below said path, and a lowered retracted position where the forward portion of said arm is to one side of said conveyor and below said path, another pair of endless, elongated belts in tandem including a forward belt positioned forwardly of a rear belt, said other belts being to one side of and substantially matching the first-mentioned pair of belts, another stacker arm connected at one point to the forward belt of said other pair of belts and at another point to the rear belt of said other pair of belts, said other stacker arm being supported by said other pair of belts for movement in a course which substantially matches the course in which the first-mentioned arm moves, motor-powered means for driving said belts, with said other stacker arm being moved out-of-phase with movement of the first-mentioned stacker arm, an abutment disposed forwardly of said belts in a position to engage an article carried on a stacker arm on such arm moving from its extended lowered position to its retracted lowered position, said abutment on engaging an article preventing the article from following the arm whereby the article is permitted to drop as the arm retracts, and an elevatable platform disposed under said arm with the arm in its extended lowered position for receiving articles dropped from the arm.

References Cited

UNITED STATES PATENTS

| | | | |
|---|---|---|---|
| 648,423 | 5/1900 | North | 271—674X |
| 2,686,603 | 8/1954 | Lawson | 214—6H |

JOSEPH WEGBREIT, Primary Examiner

U.S. Cl. X.R.

214—6DK